US007412131B2

(12) United States Patent
Lee et al.

(10) Patent No.: US 7,412,131 B2
(45) Date of Patent: Aug. 12, 2008

(54) MULTILAYER OPTIC DEVICE AND SYSTEM AND METHOD FOR MAKING SAME

(75) Inventors: Susanne Madeline Lee, Albany, NY (US); Forrest Frank Hopkins, Cohoes, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/619,009

(22) Filed: Jan. 2, 2007

(65) Prior Publication Data

US 2008/0159484 A1 Jul. 3, 2008

(51) Int. Cl.
*G02B 6/42* (2006.01)

(52) U.S. Cl. .......................... 385/31; 385/14; 385/115; 385/116; 385/117; 385/118; 385/119; 385/129; 385/131; 385/132; 385/146; 378/6; 378/21; 378/34; 378/41; 378/42; 378/43; 378/44; 378/71; 378/72; 378/74

(58) Field of Classification Search .................. 385/14, 385/31, 115–119, 129, 131, 132, 146; 378/6, 378/21, 34, 41–44, 71, 72, 74
See application file for complete search history.

(56) References Cited

U.S. PATENT DOCUMENTS 5,192,869 A 3/1993 Kumakhov
6,571,044 B2 * 5/2003 Veligdan ..................... 385/120
6,934,359 B2 8/2005 Chen et al.
7,006,741 B1 * 2/2006 Yu ............................ 385/121
2005/0086275 A1 * 4/2005 Moore et al. ................ 708/200

OTHER PUBLICATIONS

Tournear et al., "Gamma-Ray Channeling in Layered Structures", IEEE, pp. 4282-4285, 2004.

* cited by examiner

*Primary Examiner*—Brian Healy
*Assistant Examiner*—Hung Lam
(74) *Attorney, Agent, or Firm*—William E. Powell, III

(57) ABSTRACT

An optic device, system and method for making are described. The optic device includes a first solid phase layer having a first index of refraction with a first photon transmission property and a second solid phase layer having a second index of refraction with a second photon transmission property. The first and second layers are conformal to each other. The optic device may be fabricated by vapor depositing a first layer and then vapor depositing a second layer thereupon. The first layer may be deposited onto a blank or substrate. The blank or substrate may be rotated during deposition. Further, a computer-controlled shutter may be used to alter the deposition rate of material along an axis of the optic device. Alternatively, the optic device may be moved at varying speeds through a vapor stream to alter the deposition rate of material.

34 Claims, 7 Drawing Sheets

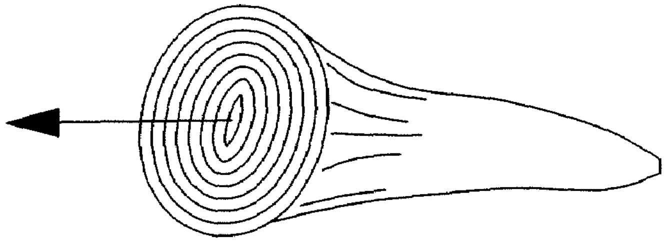
FIG.9
FIG.10
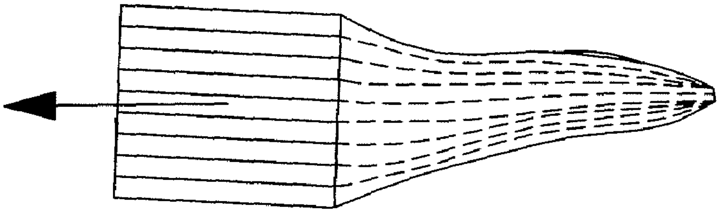
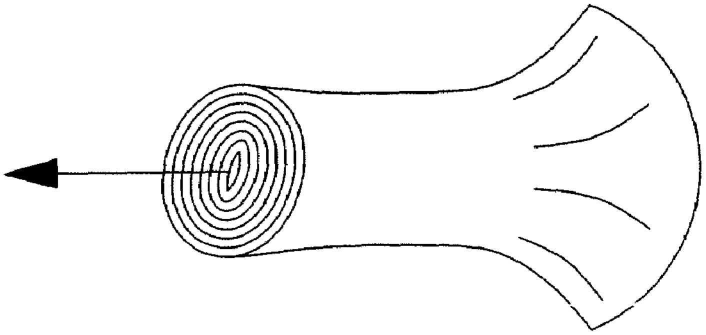
FIG.11
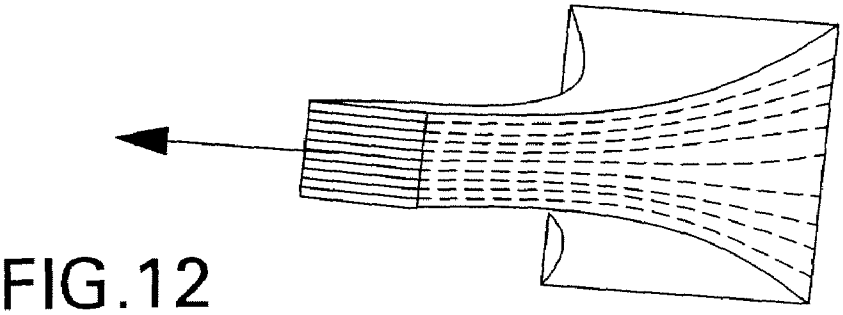
FIG.12

MULTILAYER OPTIC DEVICE AND SYSTEM AND METHOD FOR MAKING SAME

BACKGROUND

The invention relates generally to optics, and more particularly to multilayer optic devices and methods for making the same.

Numerous applications exist that require a focused beam of electromagnetic radiation. For example, energy dispersive X-ray diffraction (EDXRD) may be used to inspect checked airline baggage for the detection of explosive threats or other contraband. Such EDXRD may suffer from high false positives due to weak diffracted X-ray signals. The weakness of the X-ray signals may stem from a variety of origins. First, the polychromatic X-ray spectrum used in EDXRD is produced by the Bremsstrahlung part of the source spectrum, which is inherently low in intensity. Second, X-ray source may collimation eliminate more than 99.99 percent of the source X-rays incident on the baggage volume under analysis. Third, some of the materials being searched for, e.g., explosives, may not diffract strongly as they are amorphous. Fourth, the diffracting volume may be small. The last two limitations arise from the type of threat materials being searched for in baggage, making all but the second limitation unavoidable.

At lower X-ray energies, such as 80 keV and below, increasing the polychromatic X-ray flux density at the material being inspected has been addressed by coupling hollow glass polycapillary optics to low powered, sealed tube (stationary anode) X-ray sources. An example of hollow glass polycapillary optics may be found in, for example, U.S. Pat. No. 5,192,869. The glass is the low index of refraction material, and air filling the hollow portions is the high index of refraction material. These types of optics typically do not provide much gain at energy levels above 80 keV, since the difference in the indices of refraction between air and glass becomes increasingly small as energy levels approach and surpass 80 keV.

Further, such optics use a concept of total internal reflection to reflect X-rays entering the hollow glass capillaries at appropriate angles back into the hollow capillaries, thereby channeling a solid angle of the source X-rays into collimated or focused beams at the output of the optic. As used herein, the term "collimate" refers to the creation of quasi-parallel beams of electromagnetic (EM) radiation from divergent EM beams. Only about five percent of an EM source's solid angle typically is captured by the input of such known optics.

In addition, the use of air in known optics as one of the materials prevents such optics from being placed within a vacuum. Thus, known optics are limited in their potential uses.

It would thus be desirable for a device that could collect more of the primary electromagnetic radiation source and redirect those rays to a desired spot to improve the electromagnetic radiation flux density at that spot.

BRIEF DESCRIPTION

The invention includes embodiments that relate to an optic device for transmitting photons through total internal reflection. The optic device includes at least three conformal solid phase layers. Interfaces between the solid phase layers are gapless. Further, the at least three conformal solid phase layers include at least two photon redirection regions.

The invention includes embodiments that relate to an optic device for redirecting, through total internal reflection, photons having an energy above one keV. The optic device includes a first solid phase layer having a first index of refraction and a second solid phase layer having a second index of refraction.

The invention includes embodiments that relate to a system for focusing photons through total internal reflection. The system includes a source of photons and an optic device including at least three conformal solid phase layers. Interfaces between the solid phase layers lack void areas. Further, the at least three conformal solid phase layers include at least two photon redirection regions.

The invention includes embodiments that relate to a method for forming an optic. The method includes forming a first solid phase layer, characterized by a first index of refraction, onto a blank and forming on the first solid phase layer a second solid phase layer, characterized by a second index of refraction. Between the first solid phase layer, the blank, and the second solid phase layer are at least two photon redirection regions.

These and other advantages and features will be more readily understood from the following detailed description of preferred embodiments of the invention that is provided in connection with the accompanying drawings.

BRIEF DESCRIPTION OF THE DRAWINGS

FIG. 9 is a perspective view of an optic device constructed in accordance with an embodiment of the invention.

FIG. 10 is a perspective view of an optic device constructed in accordance with an embodiment of the invention.

FIG. 11 is a perspective view of an optic device constructed in accordance with an embodiment of the invention.

FIG. 12 is a perspective view of an optic device constructed in accordance with an embodiment of the invention.

DETAILED DESCRIPTION

Figure 1:
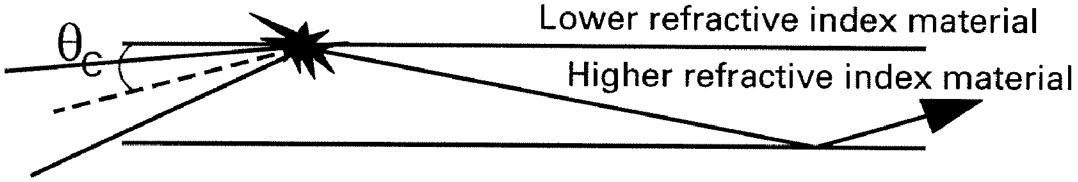
FIG. 1 is a schematic view illustrating the phenomenon of total internal reflection.
Figure 2:
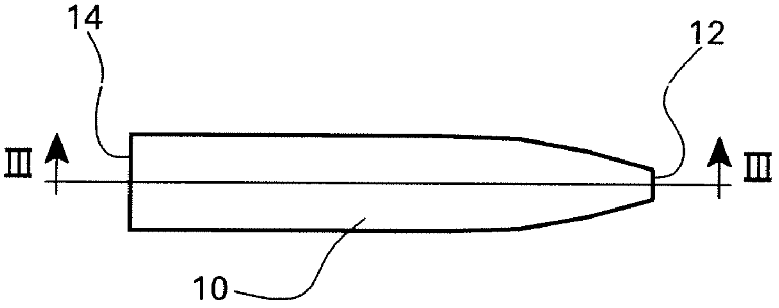
FIG. 2 is a top schematic view of an optic device constructed in accordance with an embodiment of the invention.
Figure 3:
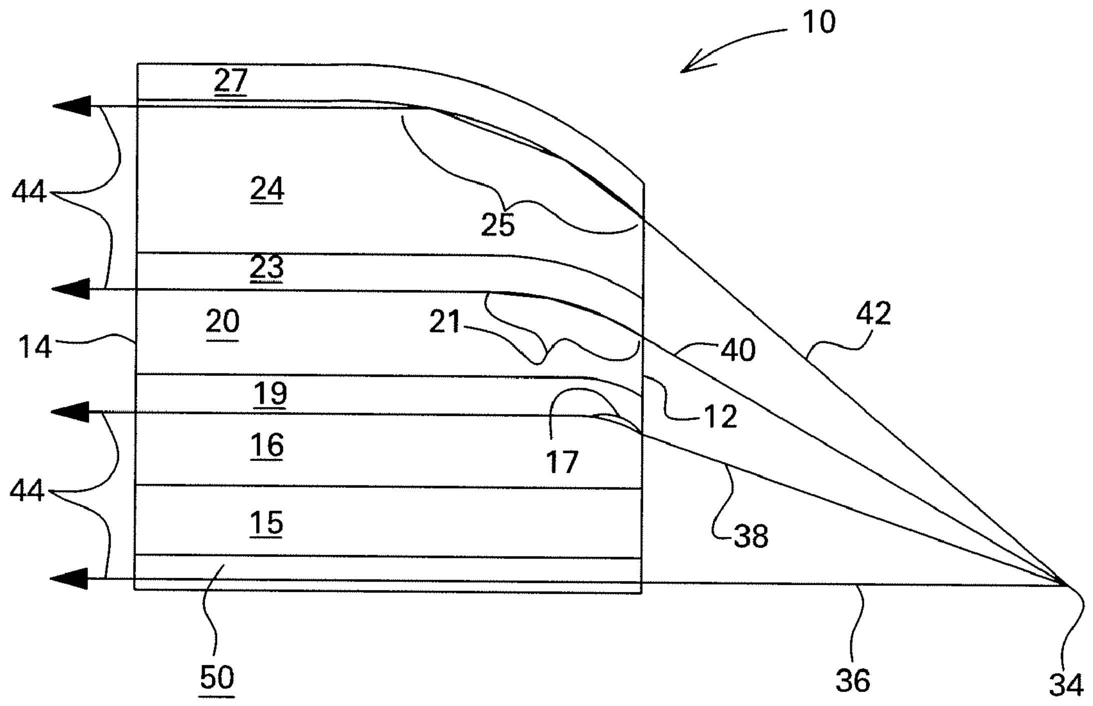
FIG. 3 is a cross-sectional view of the optic device of FIG. 2 taken along line III-III.
Figure 4:
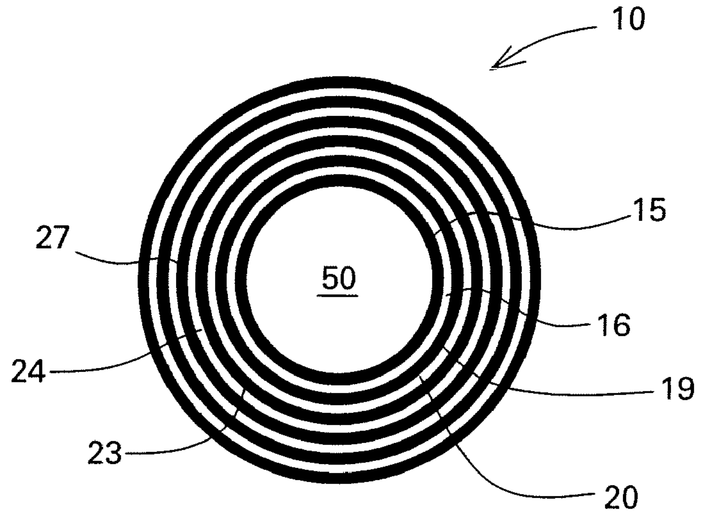
FIG. 4 is a side schematic view of the optic device of FIG. 2.

Embodiments of the invention described herein utilize the phenomenon of total internal reflection. Referring to FIG. 1, when an angle of incidence is less than a critical angle $\theta_c$, total internal reflection occurs. The critical angle $\theta_c$ for total internal reflection depends on, among other factors, the material, the difference in the relative indices of refraction, and the energy of the incident photons.

Referring now to FIGS. 2-5, there is shown a multilayer optic 10 including an input face 12 and an output face 14. By "multilayer" is meant a structure that has a plurality of monolayers. As shown more particularly in FIGS. 3 and 4, the multilayer optic 10 includes multiple layers of material, each having a different index of refraction. For example, there are layers 16, 20, and 24 surrounding a core 50. Layer 16 is positioned radially exterior to and contiguous with the core 50. The core 50 may be formed of a higher index of refraction material such as beryllium, lithium hydride, magnesium, or any other suitable elements or compounds having similarly higher refractive indices and high X-ray transmission properties. The core 50 be less than a micrometer to greater than one centimeter in diameter. Layer 20 is positioned radially exterior to layer 16 and radially interior to layer 24 and contiguous with both layers 16 and 24.

In one embodiment, the layers making up the multilayer optic 10 may be formed of materials that have varying indices of refraction. For example, layers 15, 19, 23 and 27 may be formed of materials that have a lower index of refraction and a high photon absorption. For example, for high energy X-rays, appropriate materials may be chosen from osmium, platinum, gold, or any other suitable elements or compounds having similarly lower refractive indices and high X-ray absorption properties. Further, the core 50 and layers 16, 20 and 24 may be formed of materials having a higher index of refraction and a high photon transmission. For example, for high energy X-rays, appropriate materials may be chosen from beryllium, lithium hydride, magnesium, or any other suitable elements or compounds having similarly higher refractive indices and high X-ray transmission properties. The diameter of the core 50 is determined by the critical angle for total internal reflection between the higher index of refraction of the core 50 and the lower index of refraction of the layer 16.

By using alternating lower and higher index of refraction materials with concurrent high and low X-ray absorption properties, respectively, in contiguous layers, the multilayer optic 10 can utilize the principle of total internal reflection of electromagnetic radiation. Specifically, diverging electromagnetic radiation beams 36, 38, 40, and 42 containing photons and stemming from an electromagnetic radiation source 34 enter the input face 12 and are redirected into quasi-parallel beams of photons 44 exiting the output face 14.

Multilayer optics in accordance with embodiments of the invention, such as optic 10, can collect a large solid angle of an X-ray source 34 and redirect polychromatic energies into quasi-parallel photon beams. "Quasi-parallel" means that diverging beams of photons have been collected and focused into beams of electromagnetic radiation or photons to exit the output face 14 at or below the critical angle $\theta_c$. This divergence causes the X-ray beam to be larger than the output face 14 of the optic 10. Alternatively, multilayer optics in accordance with embodiments of the invention may be configured to produce slightly focused, highly focused, slightly diverging, or highly diverging beams. By "slightly focused" is meant that the beam size at the point of interest (i.e., where the diameter of the beam is of concern) is approximately the same as at the output face 14 of the optic 10. By "highly focused" is meant that the beam size at the point of interest is smaller than at the output face 14 of the optic 10. By "slightly diverging" is meant that the beam size is larger than a quasi-parallel beam but smaller than the intrinsic source beam. By "highly diverging" is meant that the beam is the same size or larger than the intrinsic source beam.

The composition of materials making up the multilayer optic 10, the macroscopic geometry of the multilayer optic 10, the thickness of the multilayer optic 10, and the number of individual layers determine the angular acceptance range of the multilayer optic 10. The angular acceptance range may be from about 0 steradians up to about 2π steradians of a solid angle of a source of the photons. For ease of illustration, only a few layers have been illustrated with reference to multilayer optic 10. However, it should be appreciated that any number of layers, including into the hundreds, thousands, or millions of layers, can be fabricated to utilize total internal reflection to form the various types of photon beams listed previously.

Another feature of the multilayer optic 10 is that the core 50 and the layers 16, 20, 24 have photon redirection regions. For example, layer 16 has a photon redirection region 17 stemming from a center of curvature; layer 20 has a photon redirection region 21 stemming from a second center of curvature; and, layer 24 has a photon redirection region 25 stemming from yet another center of curvature. The photon redirection regions 17, 21, 25 are chosen to allow for the diverging electromagnetic radiation beams 36, 38, 40, and 42 to be made parallel or near parallel, or conversely to allow for parallel or converging electromagnetic radiation beams to be made diverging. The minimum photon redirection region is determined by the minimum thickness that would still enable a smooth surface, which is at least two atomic layers, or about ten angstroms. The photon redirection regions 17, 21, 25 each contain redirecting segments. The redirecting segments are chosen such that they each have a constant curvature. The curvature of each redirecting segment may be the same as or different from the curvatures of other redirecting segments. If each of the redirecting segments for a particular photon redirection region is straight, then the radius of curvature is infinite.

Figure 5:
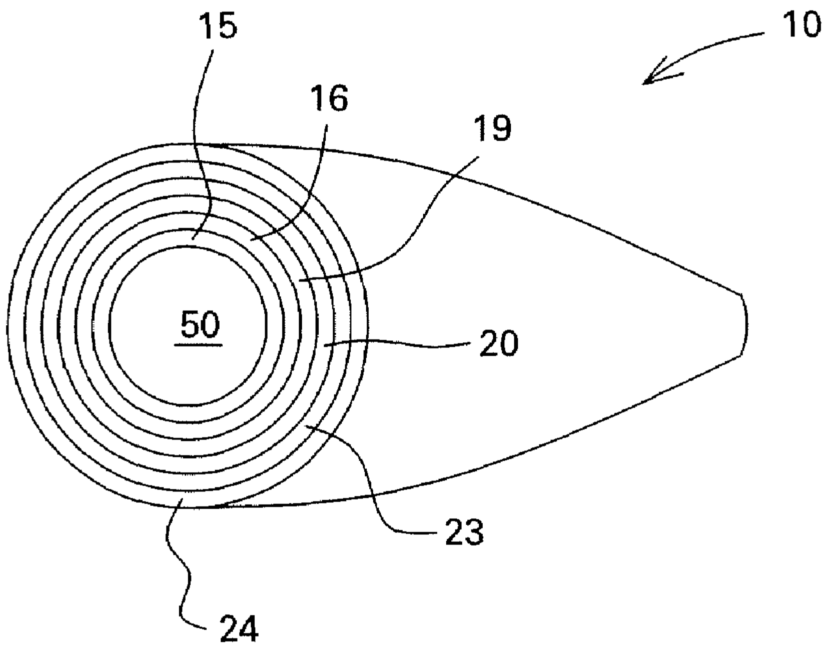
FIG. 5 is a perspective view of the optic device of FIG. 2.

By curving the multilayers 16, 20, 24 at the input side of the optic 10, the photons or electromagnetic radiation 36, 38, 40, 42 entering the input face 12 can be redirected into parallel pencil beams 44, thereby increasing the photon flux density at the output face 14 over the photon flux density in the direct source beam at the same distance from the source 34. Depending upon the number of layers in the multilayer optic, there may be a photon density gain for 100 keV photons of as much as 5000 times in the electromagnetic radiation output from the multilayer optic over the output of conventional pinhole collimators. It should be appreciated that, alternatively, the output face 14 may be formed closer to the input face 12, i.e., positioned prior to the region where the photons are redirected into parallel rays, allowing the input electromagnetic radiation beams 36, 38, 40, 42 to remain somewhat diverging as they exit the output face 14. It should further be appreciated that core 50 and any number of the layers may have no arc of curvature, instead having a cylindrical cross-sectional profile. Finally, it should be appreciated, and as illustrated in FIG. 5, that additional layers can be formed contiguous with those described and illustrated in FIGS. 3 and 4.

An important feature of this optic 10 is that the layers can be made thin enough and the overall optic length (from input face 12 to output face 14) short enough that photons are redirected through bounces along only one side of a particular layer, for example, layer 24. This is unlike known optics, where the photons bounce off both sides of a particular layer. The fewer number of bounces needed to redirect the photons in this multilayer optic 10 significantly increase the photon transmission efficiency of the optic 10.

Another feature of the multilayer optic 10 is that through fabrication techniques that will be described in detail below, the individual layers can be formed conformally on one another. The conformation of the layers enables the multilayer optic 10 to be utilized in a vacuum environment. Prior art optics utilize air as the higher refractive index material. Such optics cannot be used in vacuum environments. Further, the multilayer optic 10 can be utilized in applications that operate at energy levels above 60 keV, such as, for example, X-ray diffraction, explosive detection, industrial X-ray, and cargo inspection, to name a few. Some of these applications may operate at energy levels as high as 450 keV.

Figure 6:
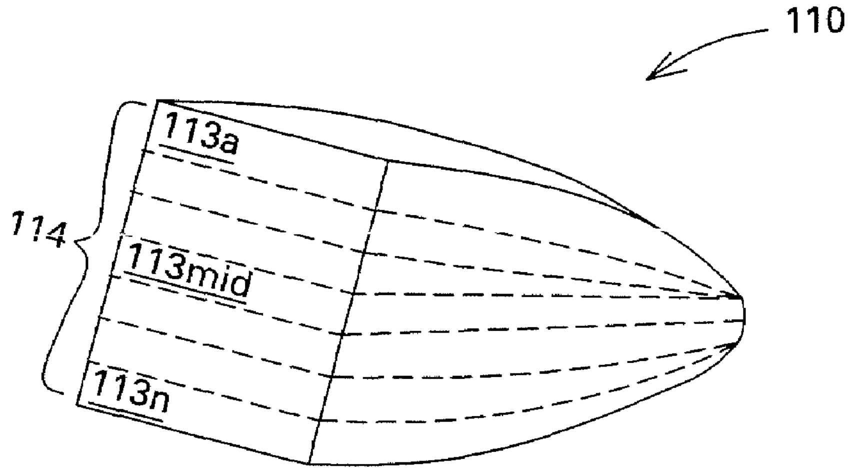
FIG. 6 is a perspective view of an optic device constructed in accordance with an embodiment of the invention.

Referring now to FIG. 6, there is shown a multilayer optic 110 including a plurality of layers 113*a*-113*n*, one on top of the other, extending between an input face 112 and an output face 114 having a polygonal profile. As illustrated, the middle layer of the multilayer optic 110 is layer 113*mid*. Except for layer 113*mid*, all of the layers include a photon redirection region positioned between the input face 112 and the output face 114. It should be appreciated, however, that layer 113*mid* may include a photon redirection region, or that other layers in addition to 113*mid* may lack a photon redirection region. The design shown allows diverging electromagnetic radiation to be input into the input face 112, redirected by the optic multilayers, and output from the output face 114 into a parallel fan beam. Depending upon where the output face 114 is located relative to the photon redirection regions, the fan beams may be parallel or near parallel or may be somewhat divergent but still focused relative to the input of electromagnetic radiation. Additionally, the conformal nature of the individual layers allows for the multilayer optic 110 to be utilized in a vacuum environment.

Figure 7:
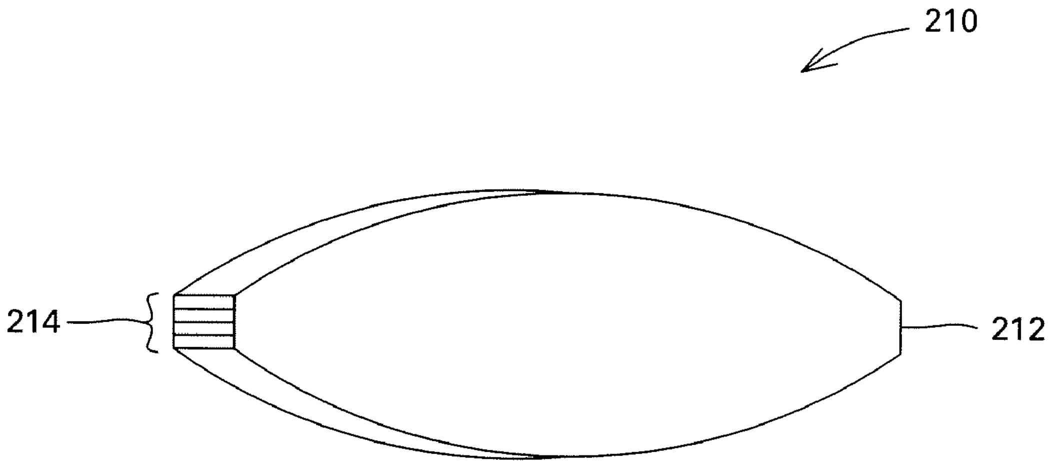
FIG. 7 is a perspective view of an optic device constructed in accordance with an embodiment of the invention.

Referring to FIG. 7, there is shown a multilayer optic 210 that includes an input face 212 and an output face 214. As with the embodiment shown in FIG. 6, the multilayer optic 210 includes individual layers sandwiching a mid-layer. The design shown allows for a focused parallel fan beam output. As with the previously described embodiments, the conformal nature of the individual layers allows the multilayer optic 210 to be used in a vacuum environment.

Figure 8:
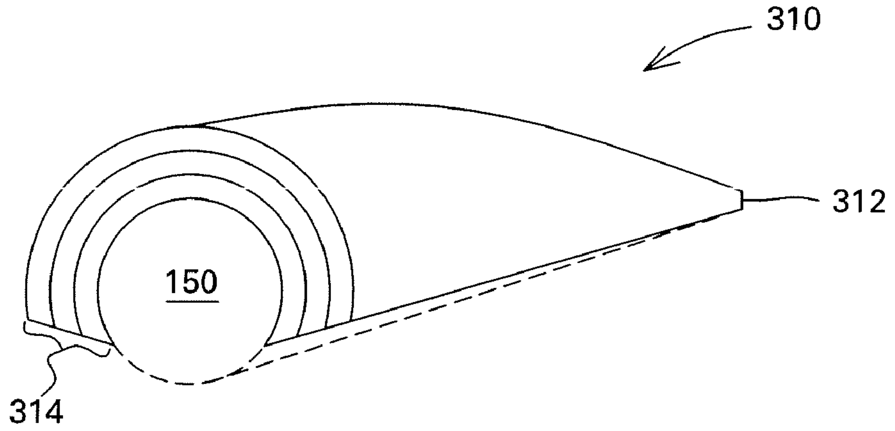
FIG. 8 is a perspective view of an optic device constructed in accordance with an embodiment of the invention.

FIG. 8 illustrates a multilayer optic 310 having an input face 312 and an output face 314. The layers have been positioned over a cone 150, which serves as a blank or mold for the individual layers. Through this design, the output beam exiting the output face 314 is shaped into a curved output, which can be coupled to a singly curved diffracting crystal (not shown) to enable the creation of a fan beam of highly monochromatic radiation. Monochromatic radiation is used in several different applications, including, for example, X-ray diffraction. Highly monochromatic radiation is radiation within a very narrow energy range approximately equal to that produced by diffracting from a single crystal. The singly curved diffracting crystal can be formed of any suitable material, such as, for example, mica, silicon, germanium, or platinum and curved so that the crystal conforms to the surface of, for example, a cone or cylinder. The suitability of any material for use as the diffracting crystal is dependent upon the diffraction intensity and the lattice spacing of the material. It should be appreciated that the multilayer optic 310 should be positioned between the source of the electromagnetic radiation and the diffracting crystal.

Placing a filter at the input or the output faces of the optics in FIGS. 5-7 will make the output radiation from these optics quasi-monochromatic. Quasi-monochromatic radiation is radiation within a limited wavelength range that is greater than the highly monochromatic range but less than the full Bremsstrahlung spectrum from an X-ray source.

FIGS. 9-12 illustrate various other potential embodiments of multilayer optics. FIGS. 9 and 10 illustrate multilayer optics that have output faces in a photon redirection region, thereby allowing such optics to emit highly diverging beams. FIGS. 11 and 12 illustrate multilayer optics whose output faces are dimensionally smaller than their respective input faces, allowing such optics to emit highly focused beams.

Figure 13:
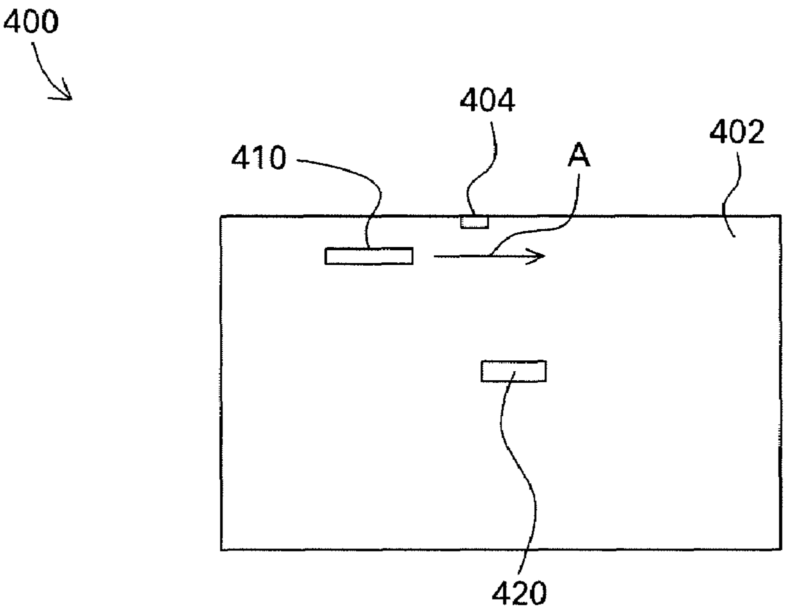
FIG. 13 is a schematic view of a deposition assembly constructed in accordance with an embodiment of the invention.

Referring now to FIG. 13, next will be described an apparatus for use in forming a multilayer optic. Specifically, a multilayer optic deposition assembly 400 is shown including a deposition chamber 402 and a movable shutter apparatus 410. The deposition chamber 402 may be utilized in suitable deposition techniques, including, for example, vapor deposition, or thermal spray deposition. Suitable vapor deposition techniques include sputtering, ion implantation, ion plating, laser deposition, evaporation, and jet vapor deposition. Evaporation techniques may include thermal, electron-beam, or any other suitable technique resulting in appreciable deposition of material. Suitable thermal spray deposition includes combustion, electric arc, and plasma spray. The deposition chamber 402 includes an inputting apparatus 404 for allowing ingress of deposition materials into the deposition chamber 402. It should be appreciated that the inputting apparatus 404 may include numerous inlet nozzles, each being associated with a specific deposition material. A blank 420 is positioned within the deposition chamber 402. The blank 420 may be a core 50 or a cone 150, described previously with regard to the embodiments illustrated in FIGS. 4 and 8, or it may be a substrate serving as a support mechanism for deposited layers. It should be appreciated that the blank 420 can assume virtually any suitable geometric configuration consistent with the desired beam profile. Examples of the almost infinite number of suitable geometric configurations include a circular wafer, a rectangular prism, a cone, a cylinder, and an egg-shape, to name a few.

The shutter apparatus 410 enables the formation of a multilayer optic wherein the individual layers have a photon redirection region. Specifically, as a deposition material is input into the deposition chamber 402 through the inputting apparatus 404, the shutter apparatus 410 moves in a direction A relative to the blank 420. If the speed of the shutter apparatus 410 decreases as it moves in the direction A, an increasing amount of deposition material will contact the blank 420 in the direction A, thereby enabling the formation of a multilayer optic with individual layers having different thicknesses and having photon redirection regions. Control of the movement and velocity of the shutter apparatus 410 may be accomplished electronically with a digital controlling mechanism, such as a microcontroller, microprocessor, or computer. Alternatively, control of the movement may be accomplished manually, or mechanically, such as, pneumatically, hydraulically, or otherwise.

By moving the shutter apparatus 410 along direction A as each deposition material is input through the inputting apparatus 404 into the deposition chamber 402, the individual layers can be deposited upon the blank 402, and a multilayer optic having conformal individual layers, like the multilayer optic 110, can be formed. In forming a multilayer optic like the multilayer optic 110, the first layer to be laid down may be the mid-layer 113*mid*. Then, the subsequent layers leading to and including layer 113*a* can be deposited. Then, the partially formed multilayer optic can be turned over and the layers leading to and including layer 113*n* can be deposited. Further, assuming a constant rate of deposition material being injected into the deposition chamber 402, if the shutter apparatus 410 is programmed to begin with a first velocity, transition into a second different velocity, and then transition back to the first velocity, a multilayer optic like the multilayer optic 210 can be formed. It should be appreciated that the deposition rate of the deposition material in the deposition chamber 402 may be altered as well.

Instead of utilizing a shuttle apparatus 410, it is possible to move at varying speeds the inputting apparatus 404 relative to the blank 420. Further, it is possible to move at varying speeds the blank 420 within the deposition chamber 402 relative to the inputting apparatus 404.

Figure 14:
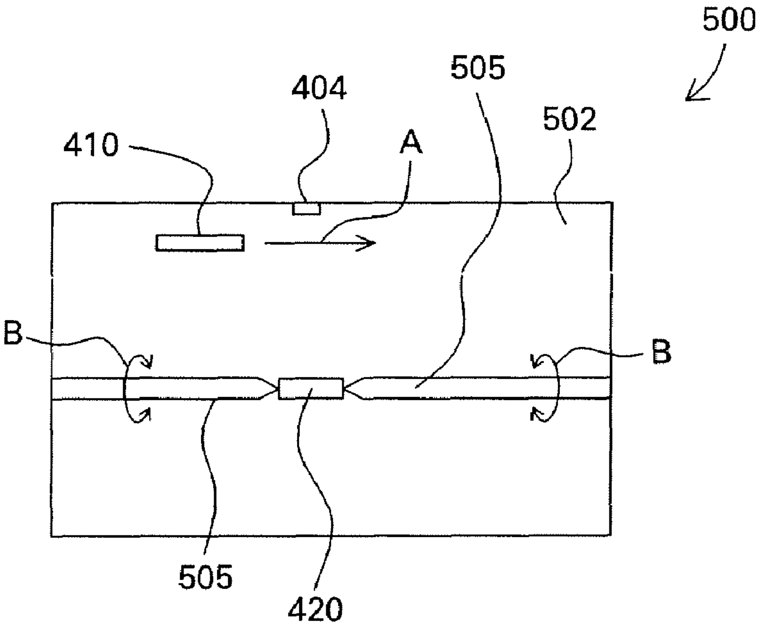
FIG. 14 is a schematic view of a deposition assembly constructed in accordance with an embodiment of the invention.

Referring to FIG. 14, there is shown a multilayer optic deposition assembly 500 that includes a deposition chamber 502 and the movable shutter 410. The deposition chamber 502 includes the apparatus 404 that is the source of a vapor stream and a pair of rotatable spindles 505. The spindles 505 are capable of rotating in a direction B. Further, the spindles 505 each include a pointed end that comes into contact with and holds the blank 420. By rotating the spindles 505 in the same direction B the blank 420 can be rotated while deposition material is introduced into the deposition chamber 502 through the inputting apparatus 404. Movement of the shutter apparatus 410 in the direction A and rotation of the blank 420 in the direction B will enable the formation of a multilayer optic such as the multilayer optic 10. Alternatively, the spindles 505 can remain in a non-rotating state during a first set of deposition steps to form the layers 113*mid* to 113*a*. Then, the spindles 505 can be rotated to turn the partially formed multilayer optic one hundred and eighty degrees around to allow for a second set of deposition steps to form the layers leading to and including 113*n* to form the multilayer optic 110.

Instead of utilizing a shutter apparatus 410, it is possible to move at varying speeds the inputting apparatus 404 relative to the blank 420 while the blank 420 is being rotated by the spindles 505. Further, it is possible to move at varying speeds the spindles 505 and the blank 420 within the deposition chamber 402 relative to the inputting apparatus 404.

Figure 15:
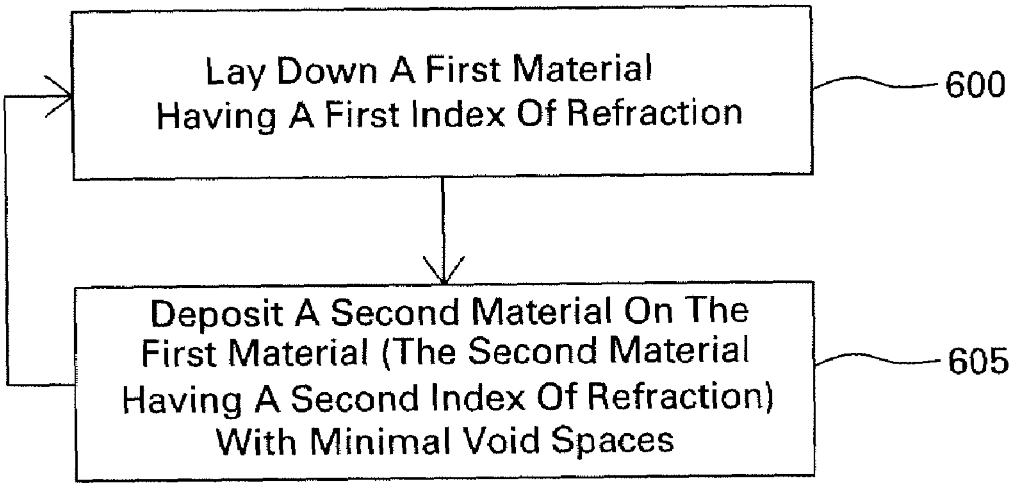
FIG. 15 illustrates process steps for fabricating an optic device in accordance with an embodiment of the invention.

FIG. 15 illustrates process steps for forming a multilayer optic in accordance with an embodiment of the invention. At Step 600, a first material having a pre-determined index of refraction with a pre-determined photon transmission coefficient is laid down. The first material is laid down on a blank or substrate, which may be a core, a cone, or a polygonal support mechanism. It should be appreciated that the blank or substrate may be incorporated within the multilayer optic, such as the core 50, or may serve merely as a mold, like cone 150. Then, at Step 605, a second material having a second index of refraction with a second photon transmission coefficient is deposited on the first material in such a way as to be conformal and have minimal void spaces. It should be appreciated that each individual layer may be formed at thicknesses in the range of one nanometer to thousands of nanometers. After Step 605, the Steps 600 and 605 can be sequentially repeated to prepare multiple pairs of layers, with each pair having one layer having a first index of refraction with a first photon transmission coefficient and a second layer having a second index of refraction with a second photon transmission coefficient. The deposition of the first and second materials may be accomplished by any number of suitable processes, such as, for example, vapor deposition, thermal spray deposition, or electroplating. Examples of suitable vapor deposition techniques include sputtering, ion implantation, ion plating, laser deposition (using a laser beam to vaporize a material or materials to be deposited), evaporation, or jet vapor deposition (using sound waves to vaporize a material or materials to be deposited). Evaporation techniques may be thermal, electron-beam or any other suitable technique that will result in appreciable deposition of material. Examples of suitable thermal spray deposition techniques include combustion, electric arc, and plasma spray.

It should be appreciated that during the deposition process, the partially formed multilayer optic may be rotated, oscillated, or moved, it may be turned, and it may be subjected to a deposition process whereby the deposition material is deposited at different rates along the axis of the multilayer optic. In this way, multilayer optics can be formed with various configurations and profiles that will allow for a greater amount of electromagnetic radiation to be collected from a source at the input of the optic, parallel or near parallel beams of electromagnetic radiation to be output from the multilayer optic, or the beams of electromagnetic radiation output from the multilayer optic may be shaped into pencil beams, fan beams, or curved in an arc, as an example.

Multilayer optics in accordance with embodiments of the invention may be used in various industrial applications. For example, a multilayer optic formed to emit a quasi-parallel beam having a circular cross-section may find utility in X-ray diffraction and backscatter, such as non-destructive examination, applications. A multilayer optic formed to emit a slightly focused beam with a circular cross-section may find utility in X-ray diffraction, X-ray fluorescence, and non-destructive examination applications. Multilayer optics formed to emit a highly focused beam having a circular cross-section may find utility in X-ray fluorescence and non-destructive examination applications. Multilayer optics formed to emit a slightly diverging beam having a circular cross-section may find utility in computed tomography and X-ray diagnostic system applications. Multilayer optics formed to emit a highly diverging beam having a circular cross-section may find utility in non-destructive examination applications requiring an increased field-of-view, and in medical interventional imaging and treatments requiring an increased field-of-view, such as the imaging and treatment of large tumors.

Alternatively, multilayer optics formed to emit a quasi-parallel fan beam in one plane that is quasi-parallel, slightly focused, highly focused, slightly diverging, or highly diverging in a direction parallel to the fan would produce a beam having a rectangular cross-section that may find utility in non-destructive examination applications.

Multilayer optics formed to emit a fan beam in one plane that is quasi-parallel, slightly focusing, highly focusing, slightly diverging, or highly diverging in a direction transverse to the plane may find utility in computed tomography, X-ray diagnostic system, and non-destructive examination applications. The fan beam may have a divergence the same as or greater than that of the source.

Multilayer optics formed to emit a fan beam in one plane that is slightly or highly diverging in the direction transverse to the fan beam plane may find utility in medical interventional applications, such as close-up imaging to increase field-of-view. The divergence in the direction transverse to the fan beam plane is equal to or greater than the source divergence.

A multilayer optic coupled to a diffracting crystal may produce a quasi-parallel monochromatic fan beam that may find utility, provided the intensity is great enough, in medical imaging and interventional treatments. Such monochromatic imaging would reduce a patient's dose of X-rays while increasing the resolution.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An optic device for transmitting photons, comprising at least three conformal solid phase layers, wherein interfaces between said solid phase layers are gapless and wherein said at least three conformal solid phase layers include at least two photon redirection regions for redirecting and transmitting the photons through total internal reflection.

2. The optic device of claim 1, wherein said at least three solid phase layers comprise alternating indices of refraction.

3. The optic device of claim 1, wherein said at least three solid phase layers are comprised of two or more materials.

4. The optic device of claim 2, wherein each said photon redirection region is formed to redirect the photons into a quasi-parallel beam, a slightly focused beam, a highly focused beam, a slightly diverging beam, a highly diverging beam, or a beam with a curved transverse profile.

5. The optic device of claim 4, wherein each said photon redirection region comprises a plurality of redirecting segments, each said redirecting segment having a constant curvature.

6. The optic device of claim 5, wherein a plurality of said solid phase layers comprise a photon redirection region, each said photon redirection region having a composite curvature.

7. The optic device of claim 6, wherein said composite curvatures of each of said photon redirection regions differ.

8. The optic device of claim 2, wherein centers of curvature for each photon redirection region are located along one or more axes.

9. The optic device of claim 1, comprising an input face for receiving the photons and an output face through which the photons exit the optic device.

10. The optic device of claim 9, configured to transmit photons with energies above 1 keV.

11. The optic device of claim 9, configured to transmit polychromatic radiation.

12. The optic device of claim 1, wherein each said photon redirection region is configured to redirect a photon beam selected from the group consisting of a quasi-parallel beam, a slightly focused beam, a highly focused beam, a slightly diverging beam, a highly diverging beam, and a beam with a curved transverse profile.

13. The optic device of claim 1, configured for use in X-ray diffraction.

14. The optic device of claim 1, configured for use in X-ray fluorescence.

15. The optic device of claim 1, configured for use in X-ray lithography.

16. The optic device of claim 1, configured for use in X-ray astronomy.

17. The optic device of claim 1, configured for use in non-destructive examination.

18. The optic device of claim 1, configured for use in computed tomography or X-ray diagnostic systems.

19. The optic device of claim 1, wherein said input face is adapted for an angular acceptance range of about 0 steradians up to about $2\pi$ steradians of a solid angle of a source of the photons.

20. An optic device for redirecting, through total internal reflection, photons having an energy above one keV, comprising a first solid phase layer having a first index of refraction and a second solid phase layer having a second index of refraction.

21. A system for focusing photons, comprising:

a source of photons; and an optic device comprising at least three conformal solid phase layers, wherein interfaces between said solid phase layers lack void areas and wherein said at least three conformal solid phase layers include at least two photon redirection regions for directing and transmitting photons through total internal reflection.

22. The system of claim 21, wherein said optic device is configured to redirect photons at an energy level above about one keV.

23. The system of claim 21, wherein said at least three conformal solid phase layers comprise a first solid phase layer having a first index of refraction and a second solid phase layer having a second index of refraction different than said first index of refraction.

24. The system of claim 21, wherein said optic device has an angular acceptance range of up to about $2\pi$ steradians from said source of photons.

25. The system of claim 24, wherein said first and second solid layers include photon redirection regions formed to redirect the photons into quasi-parallel beams.

26. The system of claim 21, wherein said optic device is configured to focus polychromatic radiation.

27. The system of claim 26, wherein said optic device comprises an input face for receiving the photons and an output face through which the photons exit said optic device.

28. The system of claim 27, wherein said optic device is configured for receiving X-rays.

29. The system of claim 27, wherein said optic device is configured to redirect the photons at an energy level above one keV.

30. The system of claim 27, wherein said optic device is configured to focus highly monochromatic radiation.

31. The system of claim 27, wherein said optic device is configured to focus quasi-monochromatic radiation.

32. The system of claim 27, comprising a diffracting crystal for transforming the polychromatic radiation from the output face of the optic device into a highly monochromatic beam.

33. The system of claim 27, comprising a filter for transforming the polychromatic output of the optic device into a quasi-monochromatic beam.

34. The system of claim 21, wherein said optic device is configured to redirect a photon beam selected from the group consisting of a quasi-parallel beam, a slightly focused beam, a highly focused beam, a slightly diverging beam, a highly diverging beam, and a beam with a curved transverse profile.

* * * * *